United States Patent
Celik

(10) Patent No.: US 11,273,673 B2
(45) Date of Patent: Mar. 15, 2022

(54) MODULAR NON-PNEUMATIC SUPPORT STRUCTURE

(71) Applicant: The Goodyear Tire & Rubber Company, Akron, OH (US)

(72) Inventor: Ceyhan Celik, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 223 days.

(21) Appl. No.: 16/663,458

(22) Filed: Oct. 25, 2019

(65) Prior Publication Data
US 2021/0122190 A1    Apr. 29, 2021

(51) Int. Cl.
*B60C 7/14*    (2006.01)
*B60C 7/10*    (2006.01)

(52) U.S. Cl.
CPC .............. *B60C 7/146* (2021.08); *B60C 7/107* (2021.08); *B60C 7/14* (2013.01)

(58) Field of Classification Search
CPC .... B60C 7/10; B60C 7/14; B60C 7/18; B60C 2007/107; B60C 2007/146; B60C 7/107; B60C 7/146
See application file for complete search history.

(56) References Cited

U.S. PATENT DOCUMENTS

| | | | |
|---|---|---|---|
| 5,800,643 A | 9/1998 | Frankowski | |
| 6,068,721 A | 5/2000 | Dyer et al. | |
| 6,260,598 B1 | 7/2001 | Tanaka | |
| 8,962,120 B2 | 2/2015 | Delfino et al. | |
| 9,387,726 B2 | 7/2016 | Choi et al. | |
| 10,040,317 B2 | 8/2018 | Celik | |
| 10,150,334 B2 | 12/2018 | Celik | |
| 10,207,544 B2 | 2/2019 | Celik | |
| 10,286,725 B2 | 5/2019 | Celik et al. | |
| 10,406,852 B2 | 9/2019 | Celik et al. | |
| 10,421,319 B2 | 9/2019 | Gaylo et al. | |
| 10,449,805 B2 | 10/2019 | Shoji | |
| 2003/0201043 A1 | 10/2003 | Adams et al. | |
| 2004/0069385 A1 | 4/2004 | Timoney et al. | |

(Continued)

FOREIGN PATENT DOCUMENTS

| CN | 106696605 A | * | 5/2017 |
|---|---|---|---|
| CN | 108382133 A | * | 8/2018 |

(Continued)

OTHER PUBLICATIONS

European Search Report for Serial No. EP20202825 dated Dec. 17, 2021.

*Primary Examiner* — Kip T Kotter
(74) *Attorney, Agent, or Firm* — Robert N. Lipcsik

(57) ABSTRACT

A tire for a mobile vehicle includes an outer flexible ring mounted to an inner central rim and a spoke structure extending radially between the inner central rim and the outer flexible ring. The spoke structure is constructed from a plurality of elements disposed side-by-side such that the elements extend circumferentially around the perimeter of the inner central rim and radially inside the outer flexible ring. The spoke structure further defines a plurality of triangular openings disposed between the outer flexible ring, a first element of the plurality of elements and a second element of the plurality of elements. The first element is circumferentially adjacent the second element.

15 Claims, 3 Drawing Sheets

(56) References Cited

U.S. PATENT DOCUMENTS

| | | |
|---|---|---|
| 2006/0144488 A1 | 7/2006 | Vannan |
| 2010/0193097 A1 | 8/2010 | McNier et al. |
| 2012/0205017 A1 | 8/2012 | Endicott |
| 2017/0008342 A1 | 1/2017 | Martin et al. |
| 2017/0087930 A1 | 3/2017 | Mcmaster et al. |
| 2017/0087931 A1 | 3/2017 | Gaylo et al. |
| 2017/0334245 A1* | 11/2017 | Laskowitz .............. B60C 11/00 |
| 2018/0001704 A1* | 1/2018 | Reinhardt ................ B60C 7/18 |
| 2018/0117968 A1* | 5/2018 | Wang ....................... B60C 7/00 |

FOREIGN PATENT DOCUMENTS

| | | | |
|---|---|---|---|
| CN | 108382133 A | | 8/2018 |
| FR | 366931 A | | 10/1906 |
| KR | 20180025748 A | * | 3/2018 |

\* cited by examiner

MODULAR NON-PNEUMATIC SUPPORT STRUCTURE

FIELD OF INVENTION

The present invention relates to tire assemblies, and more particularly, to non-pneumatic tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a top loader pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires are limited. It is an object of the present invention to overcome this limitation and increase the load carrying capacity and durability of these spokes and hence the performance of the top loader non-pneumatic tire or the top loader pneumatic tire.

SUMMARY OF THE INVENTION

A tire for a mobile vehicle, in accordance with the present invention, includes an outer flexible ring mounted to an inner central rim and a spoke structure extending radially between the inner central rim and the outer flexible ring. The spoke structure is constructed from a plurality of elements disposed side-by-side such that the elements extend circumferentially around the perimeter of the inner central rim and radially inside the outer flexible ring. The spoke structure further defines a plurality of triangular openings disposed between the outer flexible ring, a first element of the plurality of elements and a second element of the plurality of elements. The first element is circumferentially adjacent the second element.

According to another aspect of the tire, the plurality of elements comprises a polymer material.

According to still another aspect of the tire, the plurality of elements comprises a homogenous polymer material.

According to yet another aspect of the tire, each element of the plurality of elements has a common radial dimension.

According to still another aspect of the tire, each element of the plurality of elements has a common axial width.

According to yet another aspect of the tire, each element of the plurality of elements comprises a reinforcing layer extending entirely around a perimeter of each element.

According to still another aspect of the tire, each element of the plurality of elements includes a layer of uniform rubber material.

According to yet another aspect of the tire, each element of the plurality of elements is constructed as a separate and discreet structure prior to assembly.

A method in accordance with the present invention non-pneumatically supports a mobile vehicle. The method includes the steps of: rotating an inner central rim about a horizontal axis; mounting the inner central rim to a flexible ring; extending a spoke structure axially and radially between the inner central rim and the flexible ring; defining a plurality of elements extending axially, radially, and concentrically about the inner central rim and within the flexible ring; defining a plurality of triangular openings by two adjacent elements of the plurality of elements and the flexible ring such that the triangular openings form a concentric array about the inner central rim; and vertically loading the flexible ring such that the flexible ring and a part of the spoke structure adjacent to the flexible ring both deflect vertically.

According to another aspect of the method, each element of the plurality of elements comprises a polymer material.

According to still another aspect of the method, each element of the plurality of elements comprises a homogenous polymer material.

According to yet another aspect of the method, each element of the plurality of elements has a common radial dimension.

According to still another aspect of the method, each element of the plurality of elements has a common axial width.

According to yet another aspect of the method, a further step includes extending a reinforcing layer circumferentially and radially about each element of the plurality of elements for further tuning the flexibility/stiffness of the spoke structure.

According to still another aspect of the method, further steps include tuning the flexibility/stiffness of the spoke structure; and extending a reinforcing layer circumferentially and radially about each element of the plurality of elements.

According to yet another aspect of the method, the spoke structure comprises a uniform rubber material.

According to still another aspect of the method, a further step includes buckling part of the spoke structure at a predetermined load on the spoke structure.

According to yet another aspect of the method, each element of the plurality of elements is constructed as a separate and discreet structure prior to assembly with the remaining elements of the plurality of elements.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

Figure 1:
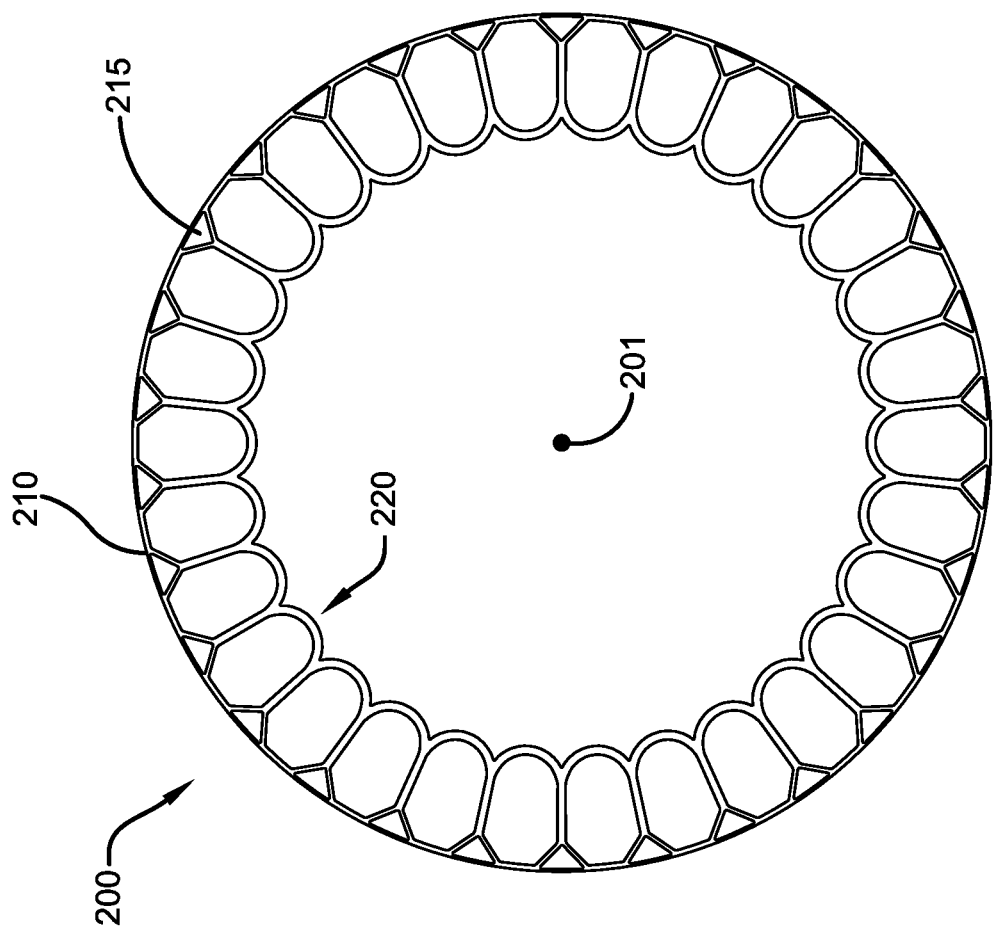
FIG. 1 is a schematic view of an example tire in accordance with the present invention.

A conventional non-pneumatic wheel/tire assembly, such as that described in U.S. Pat. Nos. 10,040,317 and 10,286,725, both incorporated herein by reference in their entirety, may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly may have an inner central rim, such as an automobile wheel, and a circular outer flexible ring, or tire 200, which may include a shear band and tread structure, mounted on the inner central rim by a continuous cord/fabric reinforced spoke structure extending between the inner central rim and the outer ring.

The spoke structure may define a plurality of cavities disposed concentrically about the inner central rim allowing the spoke structure to deflect under load thereby defining a suitable balance between flexibility for ride comfort and traction within a footprint of the assembly and stiffness for vehicle handling, low rolling resistance, and low heat build-up within the spoke structure. The cavities of the spoke structure may further define openings for arms of the inner central rim to extend therethrough and secure the spoke structure to the inner central rim. The arms may engage portions of the spoke structure in a mechanical interlocking arrangement. The inner central rim may further include plates that, along with the arms may sandwich the portions of the spoke structure and create a further frictional and/or adhesive securement between the inner central rim and the spoke structure. The spoke structure may comprise a homogenous or heterogeneous polymer and/or a filled polymer.

Another conventional wheel/tire assembly may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly may have an inner central rim, such as an automobile wheel, and a circular outer flexible ring, or tire 200, which may include a shear band and tread structure, mounted on the inner central rim by a continuous cord/fabric reinforced spoke structure extending between the inner central rim and the outer ring.

The spoke structure may define a plurality of alternating cavities and inlet openings disposed concentrically about the inner central rim allowing the spoke structure to deflect under load thereby defining a suitable balance between flexibility for ride comfort and traction within a footprint of the assembly and stiffness for vehicle handling, low rolling resistance, and low heat build-up within the spoke structure. The cavities of the spoke structure may further define openings for arms of the inner central rim to extend therethrough and secure the spoke structure to the inner central rim. The arms may engage portions of the spoke structure in a mechanical interlocking arrangement. The inner central rim may further include plates that, along with the arms may sandwich the portions of the spoke structure and create a further frictional and/or adhesive securement between the inner central rim and the spoke structure. The spoke structure may comprise a homogenous or heterogeneous polymer and/or a filled polymer.

Spokes of these spoke structures may be curved inwardly or outwardly for mitigating or enhancing buckling of the spokes. The spokes may include one or more reinforcing layers. The layer(s) may be constructed of single end dipped cords, conventional pneumatic tire ply/cord arrangements, short fibers, polymeric film, and/or other suitable composites. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The reinforcement in the spokes may be oriented at angle between 0 degrees and 90 degrees. The spokes may be continuously reinforced across their entire axial length. Continuous reinforcement layer(s) may extend radially outward to multiple locations adjacent to a shear band at the outer flexible ring.

Each cavity and inlet opening of these spoke structures may have a common cross sectional profile about the axis of rotation of the assembly. Further, each cavity and inlet opening may have a common axial length equal to a uniform axial thickness of the spoke structure. Each cavity may be curvedly shaped to prevent "pinch" points on the reinforcement layer(s) and mitigate compressive stress concentrations on the reinforcement layer(s). The number of cavities may be between 2 and 60 for large scale assemblies. The inner central rim may include steel, cast iron, aluminum, aluminum alloys, magnesium allows, iron alloys, plastics, and/or composites. The spoke structure may further have additional cavities for further adjusting the flexibility of the spoke structure.

Figure 2:
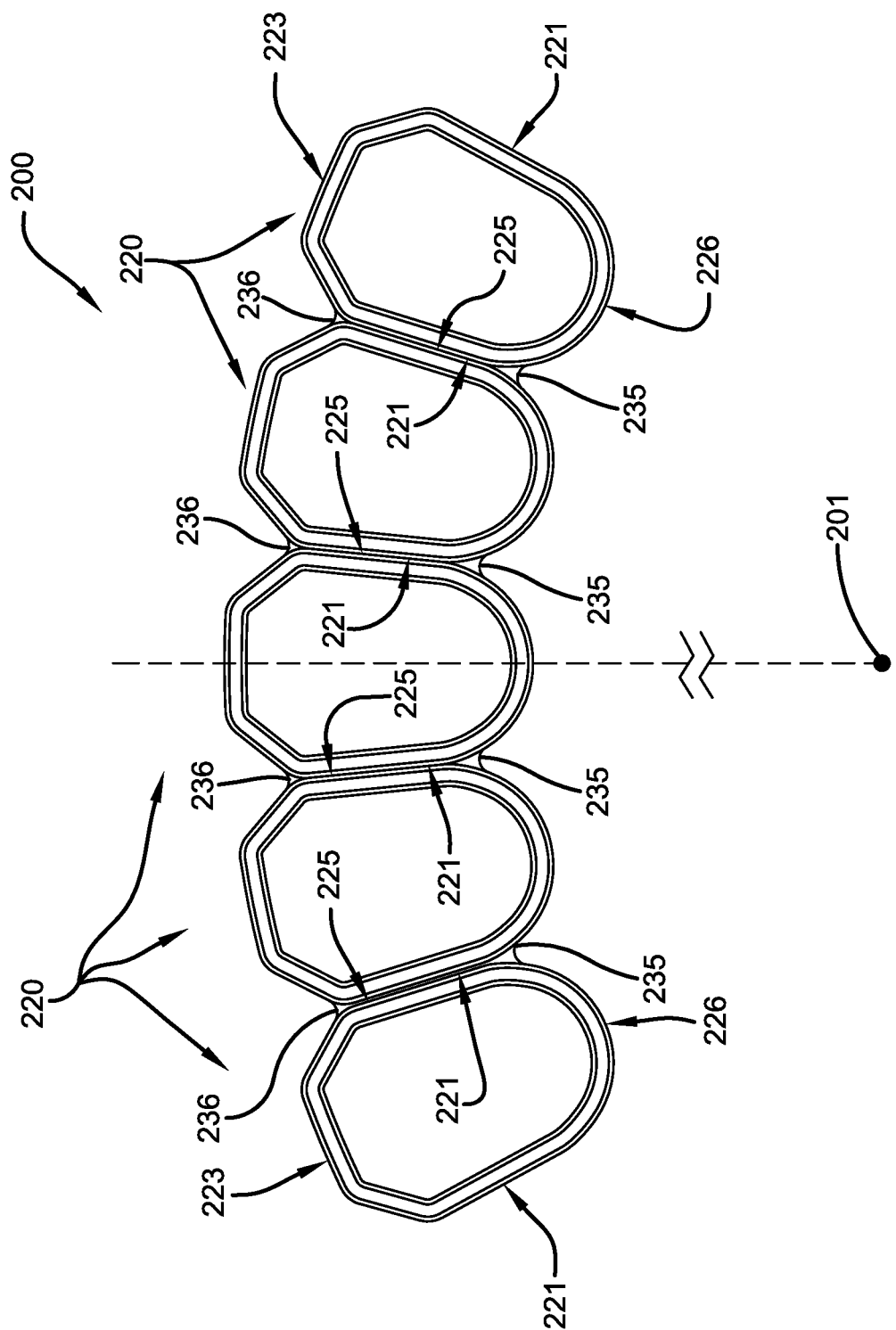
FIG. 2 is a schematic view of part of the tire of FIG. 1.
Figure 3:
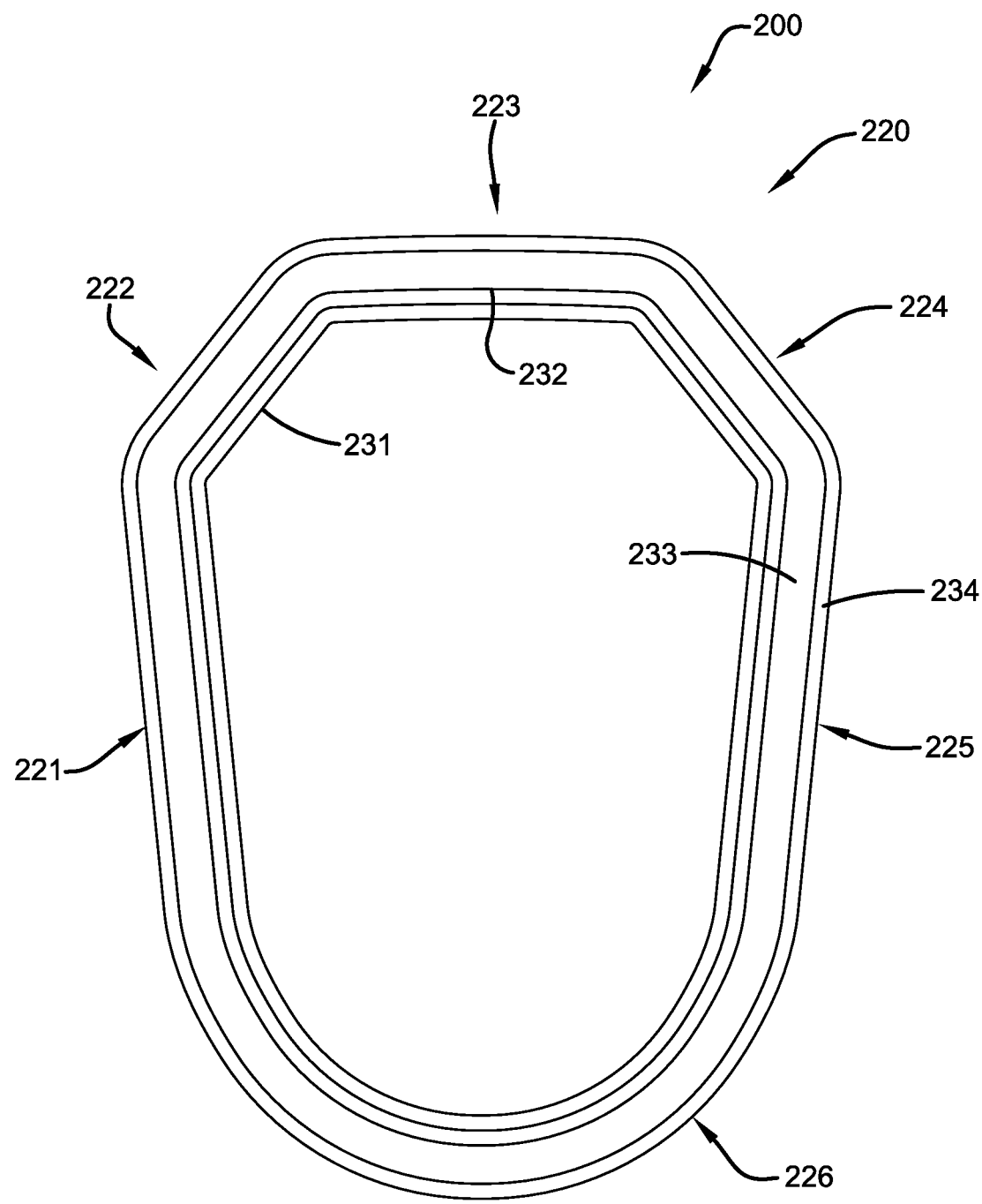
FIG. 3 is a schematic view of another part of the tire of FIG. 2 under a still different condition.

As shown in FIGS. 1-3, an example tire assembly 200 in accordance with the present invention may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The tire assembly 200 may have an inner central rim, such as an automobile wheel as described above (not shown), and a circular outer flexible ring 210, which may include a shear band with a tread structure (not shown), mounted on the inner central rim by a plurality of identical modular elements 220 (FIG. 3) aligned concentrically, side-by-side (FIG. 2), about an axis of rotation 201 of the tire 200 (FIG. 1).

As shown in FIG. 2, the modular elements 220 may be sequentially added to each other to form a curved spoke-like structure extending concentrically about the rotation axis 201 of the tire 200. In this arrangement, the first side 221 of each element 220 may be secured to the fifth side 225 of an adjacent element 220. The elements 220 may be secured relative to each other by friction fit, adhesive, fusion, cross-linking, welded, and/or other suitable means. Specifically, the first side 221 of each element 220 may be secured in this manner to a fifth side 225 of another adjacent element eventually forming a complete circular spoke-like configuration for support a load in tension as the tire 200 rotates under load.

As shown in FIG. 3, a cross-section of each element 220 may define a closed curve with a first planar side 221, a second planar side 222, a third planar side 223, a fourth planar side 224, a fifth planar side 225, and one curved side 226. The second side 222 of one element 220, the fourth side of another adjacent element 220, and the outer flexible ring 210 may form a plurality of triangular openings 215 disposed between each adjacent element 220 (FIG. 1).

The structure of the layers of each of the elements 220 may include a first layer 231, a second layer 232 connected to, or adjacent, the first layer, a third layer 233 connected to, or adjacent, the second layer, and a fourth layer 234 connected to, or adjacent, the third layer (FIG. 3). The innermost first layer 231 may be a layer of "topping" rubber to protect the interior of the elements 220 from foreign objects during rotation of the tire 200. The second-innermost, second layer 232 may also be a layer of "topping" rubber to further protect the interior of the elements 220 from foreign objects during rotation of the tire 200.

The third-innermost, third layer 233 may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be between 400 denier and 9000 denier. The polymeric film may be from 0.1 mm to 2.0 mm thick. The reinforcement in the elements 220 may be oriented at angle between 0 degrees and 90 degrees with respect to a plane perpendicular to the rotation axis 201 of the tire 200. The elements 220 may be continuously reinforced throughout their entire perimeter (FIG. 3) and the entire axial width of each element.

The outermost fourth layer 234 may also be a layer of "topping" rubber to protect the exterior of the elements 220 from foreign objects during rotation of the tire 200. A shear band (not shown) may be attached directly to the fourth layer 234 at the third side 233 of each element 220 (e.g., adhesive, fused, welded, cross-linked, etc.). One example of cross-linking may be the process of forming co-valent bonds or relatively short sequences of chemical bonds to join two polymer chains, or layers 234, together. Further, as the overall tire 200 is assembled/molded, the outermost fourth layers 234 of two adjacent elements 220 may partially flow together to form a fillet 235 where two adjacent curved sides 226 converge and a fillet 236 where two adjacent planar sides 222, 224 converge (FIG. 2).

Variations in the present invention are possible in light of the description of it provided herein. While certain representative examples and details have been shown for the purpose of illustrating the subject invention, it will be apparent to those skilled in this art that various changes and modifications can be made therein without departing from the scope of the subject invention. It is, therefore, to be understood that changes can be made in the particular examples described which will be within the full scope of the present invention as defined by the following appended claims. Further, the present invention is not limited to the examples hereinbefore described which may be varied in both construction and detail within the full scope of the appended claims.

What is claimed:

1. An assembly for a mobile vehicle comprising:
   an outer flexible ring mounted to an inner central rim; and
   a spoke structure extending radially between the inner central rim and the outer flexible ring, the spoke structure constructed from a plurality of elements disposed side-by-side such that the elements extend circumferentially around the perimeter of the inner central rim and radially inside the outer flexible ring, the spoke structure further defining a plurality of triangular openings disposed between the outer flexible ring, a first element of the plurality of elements and a second adjacent element of the plurality of elements, a cross-section of each element defining a closed curve having exactly five planar sides and exactly one curved side.

2. The assembly as set forth in claim 1 wherein the plurality of elements comprises a polymer material.

3. The assembly as set forth in claim 1 wherein the plurality of elements comprises a homogenous polymer material.

4. The assembly as set forth in claim 1 wherein each element of the plurality of elements has a common radial dimension.

5. The assembly as set forth in claim 1 wherein each element of the plurality of elements comprises a reinforcing layer extending entirely around a perimeter of each element.

6. The assembly as set forth in claim 1 wherein each element of the plurality of elements includes a layer of uniform rubber material.

7. The assembly as set forth in claim 1 wherein each element of the plurality of elements is constructed as a separate and discreet structure prior to assembly.

8. A method for non-pneumatically supporting a mobile vehicle comprising the steps of:
   rotating an inner central rim about a horizontal axis;
   mounting the inner central rim to a flexible ring;
   extending a spoke structure axially and radially between the inner central rim and the flexible ring;
   defining a plurality of elements extending axially, radially, and concentrically about the inner central rim and within the flexible ring, a cross-section of each element defining a closed curve having exactly five planar sides and exactly one curved side;
   defining a plurality of triangular openings by two adjacent elements of the plurality of elements and the flexible ring such that the triangular openings form a concentric array about the inner central rim; and
   vertically loading the flexible ring such that the flexible ring and a part of the spoke structure adjacent to the flexible ring both deflect vertically.

9. The method as set forth in claim 8 wherein each element of the plurality of elements comprises a polymer material.

10. The method as set forth in claim 8 wherein each element of the plurality of elements comprises a homogenous polymer material.

11. The method as set forth in claim 8 wherein each element of the plurality of elements has a common radial dimension.

12. The method as set forth in claim 8 further including the step of extending a reinforcing layer circumferentially and radially about each element of the plurality of elements for further tuning the flexibility/stiffness of the spoke structure.

13. The method as set forth in claim 8 wherein the spoke structure comprises a uniform rubber material.

14. The method as set forth in claim 8 further including the step of buckling part of the spoke structure at a predetermined load on the spoke structure.

15. The method as set forth in claim 8 wherein each element of the plurality of elements is constructed as a separate and discreet structure prior to assembly with the remaining elements of the plurality of elements.

* * * * *